United States Patent Office 3,159,690
Patented Dec. 1, 1964

3,159,690
MIXTURES OF UNSATURATED POLYESTERS AND
A COPOLYMERIZABLE MONOMER
Earl E. Parker, Allison Park, Pa., assignor to Pittsburgh
Plate Glass Company, Pittsburgh, Pa., a corporation
of Pennsylvania
No Drawing. Filed Mar. 27, 1962, Ser. No. 182,932
9 Claims. (Cl. 260—864)

This invention relates to the curing of interpolymerizable mixtures of (A) a polyester of a dicarboxylic acid containing a C=C—C=O group and a polyhydric alcohol, and (B) a monomer containing a >C=CH$_2$ group preferably attached to a negative radical such as the following:

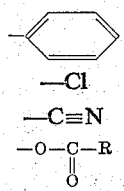

and others.

The invention relates particularly to a novel catalyzation system designed to effect smooth and rapid cure of interpolymerizable mixtures of the polyesters and monomers.

It has heretofore been recognized that when heated, liquid monomers containing the >C=CH$_2$ group attached to a negative radical, as above described, undergo addition polymerization to form valuable resins. It has also been recognized that polyesters of dihydric alcohols and alpha, beta-ethylenic dicarboxylic acids are capable of addition reactions to form resinous products. Both of these reactions are relatively slow, so long as the esters or monomers per se are employed.

It has further been recognized that mixtures of the fusible polyesters above described and the monomers soluble therein, are capable of far more rapid reaction than either of the components taken singly. For example, mixtures of (A) polyesters of glycols, such as diethylene glycol and fumaric acid, and (B) monomers, such as styrene, undergo interpolymerization reactions to form infiusible, insoluble (thermoset) addition products. If catalysts of the free radical initiator type (e.g., peroxidic compounds, such as benzoyl peroxide) are incorporated into the interpolymerizable mixtures, a vigorous interpolymerization reaction is initiated even at moderate temperatures. Indeed, the interpolymerizable mixtures are highly reactive and form polymer products so rapidly that the mixtures cannot be stored for any appreciable period of time without a strong tendency for them to undergo premature gelation and setting. This is especially true where the mixtures are subjected to somewhat elevated temperatures. Since mixing of the polyester and the monomer is often conducted with the polyester heated to impart fluidity thereto, there is danger of gelation even while the monomer is being mixed into the polyester.

In order to obviate these difficulties, it was early proposed to incorporate into the components of the interpolymerizable mixture substances termed "inhibitors," which exhibited a strong tendency to retard or hold back the interpolymerization reaction, especially at the moderate temperatures involved in the preparation of the mixtures, or in the storage of the latter after preparation. Among the materials so proposed for use as gelation inhibitors were the quinones and hydroquinones; also, catechols and substituted catechols, such as tertiary-butyl catechol, were often used. In the presence of these agents, it was easy to mix the interpolymerizable mixtures and to store the mixtures for long periods without premature change from the liquid to the gel state.

In order to effect the cure of the mixture to a final hard, thermoset state, it was customary to add to the liquid mixture at or near the end of the period of storage, a catalyst which usually was of the free radical initiator type and was represented by benzoyl peroxide or other peroxidic compound having at least some degree of solubility in the mixture.

In the curing operation, it was usually desirable that the rate of polymerization be high and that polymerization take place at moderate temperatures. This was especially true during the early stages of the reaction when it was desirable that the gel stage be reached quickly and before the temperature in the mixture had reached a very high level.

The quinonic or phenolic type of inhibitors initially added were persistent and powerful inhibitors; in fact, they continued to exert a very strong retarding effect on interpolymerization even after the free radical initiators, such as cumene hydroperoxide or tertiary-butyl hydroperoxide, were incorporated, and until the temperature of the polymerizable mixture was raised to a relatively high level. These persistent retarding effects were often highly undesirable, especially in the use of the interpolymerizable mixtures in casting operations. In mixtures containing these inhibitors alone, exothermal temperature was often excessive and cracked or discolored products often resulted.

In a prior patent, United States Patent No. 2,646,416 to Earl E. Parker, it has been disclosed that certain salts of amines also constitute valuable gelation inhibitors in interpolymerizable mixtures of (A) polyesters of alpha, beta-ethylenic dicarboxylic acids and polyhydric alcohols, and (B) monomers containing a >C=CH$_2$ group.

These amine salts, when incorporated into the monomer-polyester mixtures, are highly effective over a relatively broad range of temperatures, and do not adversely affect the curing characteristics of such mixtures. These characteristics in the amine salts are desirable especially in the art of casting the interpolymerizable mixtures.

It has now been discovered that if the amine salts disclosed in United States Patent No. 2,646,416 or the hydrazine salts disclosed in United States Patent No. 2,570,269 are incorporated in a mixture of (A) a polyester of a dihydric alcohol and an alpha, beta-ethylenically unsaturated acid, (B) a monomer containing a CH$_2$=C< group, and (C) a phenolic or quinonic inhibitor, the addition of the amine salt or hydrazine salt being made in the presence of an organic hydroperoxide type polymerization catalyst, the amine salt or hydrazine salt functions not as a polymerization inhibitor, as would be expected, but rather acts as a powerful accelerator of polymerization. In view of the previously recognized value as a gelation inhibitor of the amine salts and hydrazine salts, it is most surprising that they function as polymerization accelerators when added in the presence of the polymerization catalyst.

Amine salts which may be used in the practice of the invention are of the formula:

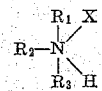

wherein X is a radical of an acid, preferably at least as strong as acetic acid, e.g., hydrochloric or hydrobromic acid. R$_1$ is a hydrocarbon radical, usually containing 1 to 18 carbon atoms, or is a hydrocarbon radical containing substituents, such as chlorine or other halogen, or aryl, or carbonyl, or the like groups, which in the salt are nonreactive groups. Groups such as methyl, ethyl, propyl, isopropyl, butyl, isobutyl, amyl, hexyl, cetyl, or aryl such as phenyl, alpha-naphthyl, or aralkyl such as benzyl may be present. $R_2$ and $R_3$ may be hydrogen, or one or both may be from the same class as $R_1$. They may also comprise added amino and imino groups, and two or more of the groups $R_1$, $R_2$ and $R_3$ may be common or interconnected other than through the nitrogen indicated in the formula.

It is to be recognized that both the quinonic or the phenolic inhibitors exert their influence as stabilizers during the period of storage of the interpolymerizable mixtures. Naturally, there is no synergistic or activating effect until a free radical initiator, such as a peroxide or hydroperoxide, is added. The amine salt is then added substantially concurrently with, or subsequent to, the addition of the peroxide.

The interpolymerizable component (mixture of polyester and monomer) which may be employed, may be any of those discussed in the aforementioned Parker patent and the latter may be employed as a source for the determination of appropriate interpolymerizable mixtures. Needless to say, any of the equivalents (many of which are well known) of the materials disclosed in the patent may also be employed, since they all depend upon a recognized mode of interaction between the ethylenic groups of the polyester and the corresponding terminal $>C=CH_2$ groups in the monomers.

In preparing polyesters which may be employed in the practice of the present invention, the polyhydric alcohol component may comprise ethylene glycol, diethylene glycol or propylene glycol and others. It is also sometimes advantageous to substitute for some of these glycols a polyethylene glycol, such as the commercial "Carbowaxes." Polyethylene glycols, such as the "Carbowaxes" are understood to have molecular weights above 300. Those most useful for this invention have weights below 4000 and preferably are in a range of about 1000 to 2000, e.g., 1500.

The polycarboxylic acid components should comprise an alpha, beta-ethylenic polycarboxylic acid, such as maleic, fumaric or itaconic acid, or the well-known derivatives of these polycarboxylic acids having ethylenic unsaturation in alpha, beta relation to a carboxyl group. Polybasic acids, such as aconitic acid, or citraconic acid, may also be employed. A plurality of acids ethylenically unsaturated in the alpha, beta position may be mixed with each other, if so desired. In many instances, it is desirable also to include a dicarboxylic acid free of ethylenic unsaturation. This latter type of dicarboxylic acid includes phthalic acid or terephthalic acid, which although they contain double bonds in the benzene ring, do not undergo addition reaction with monomer compounds and may, therefore, be considered as being the equivalent of saturated compounds. Likewise, aliphatic dicarboxylic acids, such as succinic acid, adipic acid, sebacic acid or azelaic acid, may be substituted for a part of the alpha, beta-ethylenically unsaturated dicarboxylic acid. The proportion of the non-ethylenic acid with respect to the alpha, beta-ethylenic component is susceptible of wide variation. A molecular proportion of 0.25 to 10 or 12 moles of the non-ethylenic component is preferred.

In preparing the polyester, a small excess (e.g., 5 or 10 percent) of the dihydric alcohol is usually employed. The conditions of esterification reaction are those conventionally employed in preparing polyesters. For example, the mixture of the polyhydric alcohol and the dibasic acid or acids is heated in a container which is closed except for a vent or under an inert atmosphere until water of reaction is expelled from the system, which usually occurs in a temperature range of about 150° C. to 200° C. The reaction is continued until water ceases to evolve, or until the acid value is reduced to a reasonably low point, e.g., within a range of about 5 to 50, or until the mixture becomes highly viscous or even solid when it is cooled. Usually, these conditions are attained in a period of 2 to 20 hours. In any event, the reaction is concluded before the product becomes infusible and insoluble because of the advanced stage of polymerization.

The monomers which are added to the polyester to form the interpolymerizable mixture may conveniently be selected from the following partial list, although other monomers containing at least one $CH_2=C<$ group may also be utilized.

Styrene
Alpha-methyl styrene
P-methyl styrene
Divinyl benezene

Unsaturated esters such as:

Vinyl acetate
Allyl acetate
Diallyl phthalate
Diallyl succinate
Diallyl adipate
Diallyl sebacate
Diethylene glycol-bis (allyl carbonate)
Triallyl phosphate
Methyl acrylate
Methyl methacrylate
Hexyl acrylate
Octyl acrylate
Octyl methacrylate
Durenediol dimethacrylate
Diallyl itaconate
Methyl chloroacrylate
Diallyl maleate
Diallyl fumarate The preferred monomers are liquid compounds soluble in the polyester component. They will contain the $>C=CH_2$ group and preferably, the latter will be attached to a negative radical, such as a benzene ring, a chlorine atom, an ester linkage, a nitrile group, or the like. They should preferably be free of nonaromatic carbon-carbon conjugated double bonds.

The monomer component or components may be employed over a relatively broad range, but usually, the proportion thereof upon a weight basis will be less than the polyester component. The amount of monomer should be sufficient to provide a liquid, flowable interpolymerizable mixture. Usually, the percentage of monomer will fall within a range of about 10 percent to 45 percent or 50 percent by weight of the total mixture of polyester and monomer. The preferred range of monomer is about 20 percent to 40 percent.

Since the polyester component of the interpolymerizable mixture is often highly viscous or even solid at atmospheric temperatures, it is preferred to add the monomer thereto at a temperature sufficient to render the polyester satisfactorily fluid for incorporation with the monomer. This temperature usually is in a range of about 100° C. to 120° C. and is sufficiently high, in the absence of gelation inhibitors, quickly to induce premature gelation upon introduction of the monomer into the system. This is true even in the absence of free radical initiators. Accordingly, it is preferred to include a gelation inhibitor which is a quinone or a dihydric phenol to one or both components of the mixture. Suitable inhibitors of the quinonic or phenolic class include:

P-benzoquinone
Chloranil
Hydroquinone
3-isopropyl catechol
4-t-butyl catechol
3-methyl catechol
4-ethyl catechol
4-isopropyl catechol These are but representative examples. Other phenolic inhibitors may be used in their place.

Naturally, the gelation inhibitor remains in the solution of polyester and interpolymerizable monomer and may act as an inhibitor of gelation during subsequent storage of the material before the latter is actually used. The amount of the phenolic inhibitor required in the mixture during the mixing stage is susceptible of variation, but conveniently is in a range of about 0.01 percent to 0.1 percent by weight based upon the polyester component of the mixture.

The interpolymerizable mixtures of polyesters of alpha, beta-ethylenic dicarboxylic acids and monomers containing an inhibitor as above described, may be stored over substantial periods of time, for example, several weeks or even months, without danger of premature gelation.

When the interpolymerizable mixture is to be employed in the preparation of castings or laminates, or other bodies in accordance with the provisions of the present invention, a free radical initiator which is an organic hydroperoxide (or its ester) and is activated by the amine salt, is added.

Organic hydroperoxides or their esters with carboxylic acids which may be used in combination with halogen chloride salts in the curing of interpolymerizable mixtures of polyesters of alpha, beta-ethylenic dicarboxylic acids and $>C=CH_2$ monomers comprise:

Cumene hydroperoxide
t-Butyl hydroperoxide
Hydroxycyclohexyl hydroperoxide
p-Menthane hydroperoxide
Ditertiary butyl perphthalate
Methyl ketone peroxide Many other hydroperoxides and esters thereof with carboxylic acids are disclosed in the monograph entitled "Organic Peroxides" by A. V. Tobolsky and R. B. Mesrobian, copyrighted in 1954 by Interscience Publishers, Inc., New York, pages 158–163.

A general formula of the hydroperoxides which may be used is $R(OOH)_n$, and of the esters thereof is $ROOR_1$, wherein group R is organic and $R_1$ is hydrocarbon. Ditertiary butyl perphthalate above listed is of the formula:

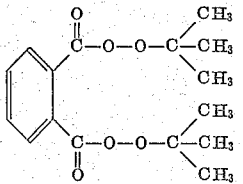

and is therefore the phthalic ester of t-butyl hydroperoxide; methyl ethyl ketone peroxide is of the formula:

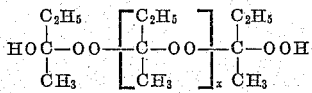

and is a polymer of the hydroperoxide of the formula:

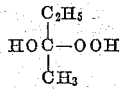

These catalysts may be utilized in amounts of about 0.1 percent to 5 percent by weight based upon the mixture. Naturally, the amount of the organic hydroperoxide catalyst applicable in the practice of the invention will vary with the activity of the particular salt and with the amount of quinone type or phenolic type inhibitor present in the interpolymerizable mixture. All of the organic hydroperoxide compounds constitute catalysts of interpolymerization at elevated temperatures and are desirable in order to attain a complete and thorough cure in the mixtures within reasonable periods of time and at reasonable temperatures.

As previously indicated, the amine salt to promote the hydroperoxidic catalyst and to effect quick gelation is added substantially at or subsequent to the addition of the catalyst.

It is an advantage of the present invention that where an amine salt is employed in accordance with the provisions of the present invention as an adjuvant for the interpolymerization reaction, even relatively mild catalysts, such as cumene hydroperoxide, may be successfully employed to attain a high rate of interpolymerization. Cumene hydroperoxide is usually considered to be a relatively slow catalyst, though it is comparatively inexpensive. Therefore, it is highly desirable to obtain activation thereof by the use of the salt.

As disclosed hereinabove, the amine salts employed as adjuvants or synergists of the hydroperoxides in the interpolymerization of stabilized mixtures in accordance with the provisions of the present invention, may be of a widely varying chemical structure. It is desirable that the salts have a reasonable degree of solubility in the interpolymerizable mixture. Some of the salts are directly soluble in the polyester or mixtures of the polyester and monomers.

Often it is desirable to provide what in effect constitutes a master batch of interpolymerizable mixture and a high concentration of salt. Such master batch can be obtained by addition of an excess of the amine salt to the molten polyester and then adding the monomer. Small portions of this master batch can subsequently be added to the main batch of polyester and monomer containing a quinone or phenolic inhibitor in substantial amount. In some instances, amine salts are soluble in monomers, such as styrene, and solutions thereof in the latter can be added to the interpolymerizable mixture. In still other instances, the amine salt can be dissolved in a common solvent, such as chloroform, which is not a reactive component of the desired resin, and the solution can be added to the polyester, the monomer, or the mixture of the two.

The amines, the salts of which may be added as promoters of gelatin and curing of stabilized mixtures of $>C=CH_2$ monomers and ethylenically unsaturated polyesters, comprise a relatively broad class, including monoamines, diamines and triamines. The amines may be primary, secondary or tertiary and they may include imide groups.

In the table to follow, the salts are indicated as being hydrochlorides. The latter are usually preferred; however, bromides and iodides are included within the scope of the invention, as are other salts, such as those of such strong carboxylic acids as oxalic acid and others. In general, the salts of the amines should be of sufficient solubility in the interpolymerizable mixture that they are dissolved in a concentration which, with the catalyst, is effective to produce quick gelling and curing. Usually, the salts should include a substantial number of carbon atoms in order to attain such solubility.

The following constitutes a partial list of hydrochloride salts from which promoters may be selected for use in the practice of the invention:

Diethylaniline hydrochloride
Dimethylaniline hydrochloride
Trimethylamine hydrochloride
Triethylamine hydrochloride
Tripropylamine hydrochloride
Tributylamine hydrochloride
Triamylamine hydrochloride
Trihexylamine hydrochloride
Diethylamine hydrochloride
Dipropylamine hydrochloride
Dibutylamine hydrochloride
Diamylamine hydrochloride
Dibenzylamine hydrochloride
Tribenzylamine hydrochloride
Pyridine hydrochloride
Alpha-naphthylamine hydrochloride
Beta-naphthylamine hydrochloride
N,N-dicyclohexyl piperazine hydrochloride
Piperidine hydrochloride Other salts which are included comprise halides of imides containing amino groups and being represented by:

2-aminopyrimidine hydrochloride
2-aminoimidazole hydrochloride

Hydrocarbon substituted hydrazines are also recognized as being similar to amines in their reactions. In United States Patent No. 2,570,269 to Parker, it is disclosed that salts of these compounds may successfully be employed as stabilizers or gelation inhibitors in interpolymerizable mixtures of $>C=CH_2$ monomers and ethylenically unsaturated polyesters.

It has now been found that the same salts may also be employed as promoters in catalyzed mixtures of $>C=CH_2$ monomers and alpha, beta-ethylenically unsaturated polyesters. Appropriate hydrazine salts for use as promoters may be selected from the group:

Phenyl hydrazine hydrochloride
Methyl phenyl hydrazine hydrochloride
Unsymmetrical diethyl hydrazine hydrochloride
Symmetrical di- and tetraethyl hydrazine hydrochloride Amounts of such salts of amines as have been described as promoters in stabilized interpolymerizable mixtures of $>C=CH_2$ monomers and alpha, beta-ethylenically unsaturated polyesters are susceptible of variations in a relatively broad range. However, there is usually a concentration of the salt in which the rate of cure is a maximum. If the amount of salt is either increased or decreased in a mixture containing a hydroperoxidic catalyst the rate of cure of the mixture tends to slow up. The rate of cure can thus be tailored to meet requirements in specific cases. Where very fast rates of cure are desired, the amount of salt should be adjusted to obtain fastest cure. Where slower rates of cure are desired, the amount of salt can either be increased or decreased to meet requirements.

In general, the percentage of the salt should fall within a range of about 0.011 percent to 2.0 percent by weight based upon the total mixture. In a majority of instances, the fastest cures are obtained when the salt is used in an amount of about 0.004 percent to about 0.1 percent by weight based upon the mixture.

The following examples are illustrative of the application of the principles of the invention. In the examples, the interpolymerizable mixtures were stabilized with hydroquinone. Cumene hydroperoxide was employed as a catalyst.

The polyester was of propylene glycol and equal moles of maleic acid and phthalic acid, the propylene glycol being employed in slight excess, e.g., 10 percent excess, over the sum of the acids. The gelation inhibitor, namely, hydroquinone, in an amount of 0.025 percent by weight based upon the polyester, was cooked in during the preparation of the polyester. This polyester in an amount of 2 parts by weight was then mixed with 1 part by weight of styrene. The resulting mixture was stable against premature gelation, so long as the catalyst was not incorporated and was employed in each of the subsequent examples. In order to test the rate of gelling of the mixture described in the examples, a tube of 16 millimeters in diameter and 125 millimeters in length was partially filled with the mixture and was then inserted in a bath at 180° F. with a thermometer inserted in the mixture at the center of the tube. The gel time was determined as being the time in minutes when lifting upon the thermometer would also lift the tube from the bath.

EXAMPLE I

This example constituted a control and in accordance with the provisions thereof, 1 percent by weight of cumene hydroperoxide based upon the mixture, was stirred in. The gel time was 19.5 minutes. The mixture in the tube would continue to cure until a hard, thermoset product was obtained.

EXAMPLE II

In accordance with the provisions of this example, two samples are prepared. In one, 0.005 percent by weight of pyridine hydrochloride is stirred into the mixture of polyesters and styrene, and then 1 percent by weight of cumene hydroperoxide based upon the mixture, is added. The second sample is treated in similar fashion, except that the pyridine hydrochloride is employed in an amount of 0.05 percent. The gel time in the two samples is, respectively, 7.7 and 11.5 minutes. The tests clearly indicate that the pyridine hydrochloride is a promoter of gelation and cure of the mixture. It would appear that the amount of the promoter in the second sample is in excess of that required to produce the maximum rate of gelation.

The samples after gelation continue to cure to provide a hard, thermoset, resinous product.

EXAMPLE III

This example is substantially a repetition of Example II, except that the pyridine hydrochloride of the former example is replaced by equal amounts of dimethylaniline hydrochloride. The gel times in the two samples are, respectively, 7.7 and 7.3 minutes. The amounts of the promoter salts are very nearly the optimum for the maximum rate of cure. The samples after gelation continue to cure to a hard, thermoset state.

EXAMPLE IV

This example is a further repetition of Example II, except that the pyridine hydrochloride of that example is replaced by diethylamine hydrochloride. The gel time for the sample containing 0.005 percent of diethylamine hydrochloride based upon the mixture, is 5.8 minutes. The sample containing 0.05 percent by weight based upon the mixture, gels in 7.3 minutes, indicating that the maximum rate of cure has been exceeded. In each instance, the mixture continues to cure in normal fashion after gelation to a hard, thermoset, resinous state.

EXAMPLE V

In this example, the pyridine hydrochloride is replaced by beta-naphthylamine hydrochloride and the techniques of Example II are repeated. The gel time for the sample containing 0.005 percent by weight of the promoter is 7.3 minutes, while that of the sample containing 0.05 percent is 5.3 minutes. The latter value seems to indicate that the maximum rate of cure has been approximated by the use of 0.05 percent by weight of the beta-naphthylamine hydrochloride.

EXAMPLE VI

In accordance with this example, the pyridine hydrochloride of Example II is replaced by phenyl hydrazine hydrochloride. The gel times of the two samples are, respectively, 2.9 and 1.9 minutes. This salt is obviously a very powerful promoter of gelation and the mixture containing the same continues to cure very rapidly to a final thermoset state.

EXAMPLE VII

The accelerator effect of certain hydrochloride salts of amines in the curing of interpolymerizable mixtures of a $>C=CH_2$ monomer and a polyester of a glycol and an alpha, beta-ethylenic dicarboxylic acid catalyzed with a number of organic hydroperoxides, is illustrated by this example.

The polyester used was of propylene glycol and substantially an equivalency of a mixture of equal moles of phthalic anhydride and maleic anhydride. The monomer was styrene and the proportions were:

| | Parts by Weight |
|---|---|
| Polyester | 65 |
| Monomer | 35 |

The polyester at 155° C. was stabilized with 0.015 part by weight of hydroquinone, the stabilized polyester was cooled to 120° C. and the styrene was added.

Two amine halide salts were tested as accelerators in the mixtures, the salts being, respectively, the hydrochloride of dimethylamine and the hydrochloride of phenyl hydrazine. These salts were made up in propylene glycol, respectively, as a 10 percent solution and a 1.0 percent solution. The accelerators were tested at two concentrations, namely, 0.1 and 0.01 percent by weight (of compound) based upon the total interpolymerizable mixture.

To each sample of interpolymerizable mixture was added 1 percent by weight based upon the mixture of hydroperoxide catalyst (or ester thereof).

The following hydroperoxides or esters thereof were so tested.

Test A (1) Cumene hydroperoxide
(2) Tertiary butyl hydroperoxide
(3) P-menthane hydroperoxide
(4) Methyl ethyl ketone peroxide (see formula)
(5) Ditertiary butyl perphthalate
(6) Methyl ethyl ketone peroxide sold as Lupersol ΔX The ditertiary butyl perphthalate is an ester of tertiary butyl hydroperoxide and, as previously indicated, is of the formula:

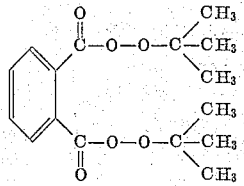

while methyl ethyl ketone peroxide is a hydroperoxide of the formula:

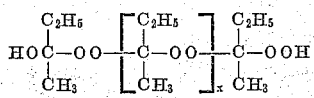

wherein $x$ is a number from 0 to 5.

The samples were subjected to gel tests at 150° F. wherein the times of gelation of each in minutes was determined and the data are tabulated in Table VIIA to follow.

In the same table, the test data are also contrasted with that of control samples containing the same hydroperoxide catalysts and being otherwise identical with the samples being tested, except for the omission of the amine hydrochloride accelerators.

TABLE VIIA

| Hydroperoxide Catalyst No. From Table A | Gel Times (Minutes at 150° F.) | | | | |
| --- | --- | --- | --- | --- | --- |
| | Dimethylamine Hydrochloride | | Phenyl Hydrazine Hydrochloride | | Control (No Amine Salt) |
| | 0.01 | 0.1 | 0.01 | 0.1 | |
| 1 | 61.1 | 19.9 | 61.7 | 5.7 | 110.8 |
| 2 | 100.7 | 28.8 | 102.8 | 7.6 | 141.0 |
| 3 | 62.5 | 16.9 | 70.9 | 4.4 | 79.5 |
| 4 | 13.4 | 12.0 | 7.3 | 5.7 | 14.7 |
| 5 | 300 | 34.6 | 120.0 | 4.4 | 398 |
| 6 | 16.4 | 15.6 | 7.4 | 6.0 | 20.9 |

It is apparent that the amine hydrochloride salts strongly activate the catalytic effect of all of the above peroxides.

The samples in the tests after gelation would continue to cure to provide hard, resinous castings.

In the foregoing Examples I through VI, the polyester component may be replaced by other polyesters. Likewise, the cumene hydroperoxide may be replaced by other organic hydroperoxide catalysts. The polyesters may, for example, by any of those described in any of the United States Patents Nos. 2,570,269, 2,593,787, or 2,646,416. The propylene maleate phthalate of any of the preceding Examples II through VI may be replaced by equal weights of any one of the following or other polyesters:

(A) The polyester of 8 moles of maleic acid and 10 moles of propylene glycol.
(B) The polyester of diethylene glycol and fumaric acid.
(C) The polyester of diethylene glycol, 7.18 moles; maleic acid, 1 mole; and adipic acid, 6 moles.
(D) The polyester of maleic acid, 1 mole; phthalic acid, 1.5 moles; and propylene glycol, 2.8 moles.
(E) The polyester of maleic acid, 9 moles; phthalic acid, 11 moles; and a slight stoichiometric excess of propylene glycol.

The monomer (styrene) in any of the preceding Examples II through VI may be likewise replaced by the other monomers listed in the foregoing patents or as listed in the preceding table of monomers. The replacement of monomers in the examples may be upon stoichiometric basis.

The forms of the invention as herein disclosed are to be considered as being by way of example rather than limitation. It will be apparent to those skilled in the art that many modifications may be made therein without departure from the spirit of the invention or the scope of the appended claims.

This application is a continuation-in-part of my co-pending application, Serial No. 570,419, now abandoned, filed March 9, 1956.

I claim:

1. A method of accelerating the polymerization of a preformed mixture of (A) a polyester of a dihydric alcohol and a mixture of two dicarboxylic acids, one of which is alpha, beta-ethylenically unsaturated and another of which is free of ethylenic and actylenic unsaturation, and (B) a monomeric compound containing a $CH_2=C<$ group, said mixture containing as a gelation inhibitor about 0.01 to about 0.1 percent by weight of the polyester of a member of a class consisting of quinone and dihydric phenols, which comprises adding to said mixture about 0.001 to about 2 percent by weight of the total mixture of a salt of a class consisting of hydrogen halides of phenyl hydrazine and hydrogen halides of an amine selected from the class consisting of secondary and tertiary amines, the addition of the salt being in the presence of cumene hydroperoxide as a polymerization catalyst.

2. A method of accelerating the polymerization of a preformed mixture of (A) a polyester of a dihydric alcohol and a mixture of two dicarboxylic acids, one of which is alpha, beta-ethylenically unsaturated and another of which is free of ethylenic and acetylenic unsaturation, and (B) styrene, said mixture containing as a gelation inhibitor about 0.01 to about 0.1 percent by weight of the polyester of a member of the class consisting of quinones and dihydric phenols, which comprises adding to said mixture about 0.001 to about 2 percent by weight based upon the total mixture of a salt of a class consisting of a hydrogen halide of phenyl hydrazine, a hydrogen halide salt of a secondary amine and a hydrogen halide salt of a tertiary amine, the addition being in the presence of an organic hydroperoxide polymerization catalyst selected from the group consisting of cumene hydroperoxide, tertiary butyl hydroperoxide, cyclohexyl hydroperoxide and methyl cyclohexyl hydroperoxide.

3. A method of accelerating the polymerization of a preformed mixture of (A) a polyester of propylene glycol and a mixture of maleic acid and phthalic acid, and (B) styrene, said mixture containing as a gelation inhibitor about 0.01 to about 0.1 percent by weight of a member of a class consisting of quinones and dihydric phenols, which comprises adding to said mixture at the time of polymerization about 0.001 to about 2 percent by weight based upon the total mixture of the polyester of a salt of a class consisting of a hydrogen halide of phenyl hydrazine, a hydrogen halide of a secondary amine and a hydrogen halide of a tertiary amine, the addition being in the presence of an organic hydroperoxide polymerization catalyst.

4. A method of interpolymerizing a preformed mixture of (A) a polyester of a glycol and an alpha, beta-ethylenically unsaturated dicarboxylic acid, and (B) a monomer containing a $CH_2=C<$ group, said mixture being stabilized against premature gelation during storage without catalyst by means of about 0.01 to about 0.1 percent by weight based upon the mixture, of an inhibitor consisting essentially of a compound selected from the group consisting of quinone and a dihydric phenol, which comprises adding to the preformed, stabilized mixture substantially concurrently, about 0.1 to about 5.0 percent by weight based upon the mixture, of a catalyst of interpolymerization, which is an organic hydroperoxide, and about 0.001 to about 2.0 percent by weight based upon the mixture, of a hydrohalide salt of an amine in which 1 to 3 hydrogen atoms of ammonia are replaced by hydrocarbon groups containing 1 to 18 carbon atoms, and then immediately interpolymerizing the mixture.

5. A method of interpolymerizing a preformed mixture of (A) a polyester of a glycol and a mixture of two dicarboxylic acids, one of which is alpha, beta-ethylenically unsaturated and the other of which is free of ethylenic and acetylenic unsaturation, and (B) a monomer containing a $CH_2=C<$ group, said mixture being stabilized against premature gelation in storage without catalyst by means of about 0.01 to about 0.1 percent by weight based upon the mixture, of an inhibitor consisting essentially of a compound selected from the class consisting of quinone and dihydric phenols, which comprises adding to the preformed, stabilized mixture substantially concurrently, about 0.1 to about 5.0 percent by weight based upon the mixture, of a catalyst of interpolymerization, which is an organic hydroperoxide, and about 0.001 to about 2.0 percent by weight based upon the mixture, of a hydrohalide salt of an amine in which 1 to 3 of the hydrogen atoms of ammonia are replaced by hydrocarbon groups containing 1 to 18 carbon atoms, and then substantially immediately interpolymerizing the mixture.

6. A method of interpolymerizing a preformed mixture of (A) a polyester of a glycol and a mixture of maleic acid and phthalic acid, and (B) styrene, said mixture being stabilized against premature gelation during storage without catalyst by means of about 0.01 to about 0.1 percent by weight based upon the mixture, of an inhibitor consisting essentially of a compound selected from the class consisting of quinone and dihydric phenols, which comprises adding to the preformed, stabilized mixture substantially concurrently about 0.1 to about 5.0 percent by weight based upon the mixture of cumene hydroperoxide of about 0.001 to about 2.0 percent by weight based upon the mixture, of a hydrohalide salt of an amine in which 1 to 3 hydrogen atoms of ammonia are replaced by hydrocarbon groups containing from 1 to 18 carbon atoms, and then substantially immediately interpolymerizing the mixture.

7. The method of claim 6 in which the hydrohalide salt is of a primary amine.

8. The method of claim 6 in which the hydrohalide salt is of a secondary amine.

9. The method of claim 6 in which the hydrohalide salt is of a tertiary amine.

References Cited in the file of this patent

UNITED STATES PATENTS

| | | |
|---|---|---|
| 2,429,060 | Hoover et al. | Oct. 14, 1947 |
| 2,935,489 | Bader et al. | May 3, 1960 |
| 2,946,770 | Bader et al. | July 26, 1960 |